United States Patent Office 3,832,271
Patented Aug. 27, 1974

3,832,271
PLASTIC COMPOSITE WITH WIRE
REINFORCEMENTS
Darral V. Humphries, Allentown, Pa., assignor to
Bethlehem Steel Corporation
Continuation-in-part of application Ser. No. 132,017, Apr.
7, 1971, now Patent No. 3,687,798, which is a continuation-in-part of application Ser. No. 853,071, Aug.
26, 1969, now abandoned, and a division of application Ser. No. 247,390, Apr. 25, 1972, which in turn is a
division of application Ser. No. 854,721, Sept. 2, 1969,
now abandoned. This application Aug. 28, 1972, Ser.
No. 284,196
Int. Cl. B32b 5/16
U.S. Cl. 161—170                                  21 Claims

ABSTRACT OF THE DISCLOSURE

A wire fiber reinforced plastic composite is formed from a styrene type resin such as polystyrene or acrylonitrile-butadiene-styrene (ABS) resin and thin ferrous metal wires or fibers. The ferrous wires or fibers are prevented from corroding at the surface of the plastic by the povision of either sacrificial wires formed from a metal such as zinc, or alternatively, ferrous wires coated with a sacrificial metal such as zinc. The ferrous wires are prevented from corroding in the interior of the composite by a tight adherent bond formed between the surface of the ferrous wires and the styrene or ABS resin by a binder of ABS resin between the ferrous metal and the plastic matrix. The tight bonding of the ferrous wires to the matrix plastic also enables a very smooth surface finish to be attained upon the finished plastic articles. In some cases the sacrificial metal may not be included in the composite.

CROSS-REFERENCES TO RELATED
APPLICATIONS

This application is a combined continuation-in-part of application Ser. No. 132,017, filed Apr. 7, 1971, now U.S. Pat. No. 3,687,798, which was in turn a continuation-in-part of application Ser. No. 853,071, filed Aug. 26, 1969, now abandoned, and a divisional application entitled "Process for Laminating Phosphate Coated Steel With ABS Resin," Ser. No. 247,390, filed Apr. 25, 1972, which is a division of application Ser. No. 854,721, filed Sept. 2, 1969, now also abandoned.

BACKGROUND OF THE INVENTION

This invention relates to metal fiber reinforced plastic composites and more particularly to corrosion resistant metal reinforced plastic composites having improved external and internal corrosion resistance.

Steel fiber reinforced plastic composites are very attractive technically and economically. The plastic provides lightness not attainable with metallic sheets while the fiber reinforcing provides strength unattainable with plastic alone, and greater stiffness than can be attained with glass or aluminum fiber reinforcing. If the steel fiber is in the form of very thin relatively short wires having, for example, the consistency of chopped steel wool, the steel reinforced plastic composite may be extruded or otherwise shaped by normal plastic forming machinery and the finished composite pieces may be cut to shape with ordinary hand or power woodworking tools. When the plastic is cut or abraded, however, the ferrous metal is exposed and tends to quickly oxidize causing unsightly and detrimental rust areas along the cut section of the composite.

In addition to the surface corrosion which may occur at the surface of a cut or abraded section of ferrous fiber reinforced plastic, if the plastic matrix is not intimately adhered to the metallic reinforcing fibers, corrosive action may migrate along the surfaces of the metal fibers into the interior of the plastic composite with possible deleterious effects to the plastic matrix.

Styrene polymer resins and acrylonitrile-butadiene-styrene (ABS) type resins have been found to be particularly useful in making metal fiber reinforced plastic composites because of their properties and economy.

Styrene polymer resins used for extrusion or injection molding are commonly formulated from reactor flake resin. Additives are generally included to promote stability and processability. A lubricating agent is usually added to the moldable grades of styrene polymers to permit easy release of the polymer from molds or dies. Particularly useful lubricants are certain metallic soaps. While a lubricant, or release agent, is usually necessary for efficient molding of a styrene polymer, the presence of the lubricant in the resin reduces the adhesion of the resin to metal reinforcements or substrates, such as steel wire or sheets.

In order to overcome the effect of the lubricant on the bonding of a styrene polymer sheet to a metal sheet, other synthetic resins, for example, epoxies and modified epoxies, are often used as a laminate between the resin and metal to promote adhesion. With epoxies, some application problems may develop, due to high viscosity and limited pot life. Also, epoxies are relatively expensive. Furthermore, molding or extrusion of the resin during processing tends to wipe the epoxy adhesive layer from the metal surface and a poor bond results.

While ferrous metal fiber reinforced plastic composites have been found to have many desirable features in comparison with plastics reinforced with other types of fibers such as for example glass reinforcing fibers, one disadvantage which has been experienced in both glass fiber reinforced plastic and metal fiber reinforced plastics has been an inability to attain a smooth defect-free molded surface. The fiberglass or metal reinforcing fibers tend during molding, stamping or extrusion to be left exposed upon the surface of the plastic part causing a rough surface which occasionally has pits in it and/or the ends of the reinforcing fibers sticking through the surface.

SUMMARY OF THE INVENTION

The foregoing corrosion difficulties have been alleviated by the present invention. In accordance with the invention small first fibers of zinc or similar metal, or ferrous metal fibers coated with zinc, or similar metal, are positioned within the plastic composite adjacent to second small fibers of ferrous metal, or ferrous metal having a non-ferrous metallic coating. The first fibers are positioned so that they are in electrical contact with the second fibers at isolated points within the body of the composite and are exposed on the surface of the composite within approximately one-eighth of an inch of the second fibers to be protected from oxidation.

The plastic matrix of the composite of the present invention is comprised of a styrene type resin, such as for example, either polystyrene resin or acrylonitrile-butadiene-styrene resin—commonly known as ABS resin, and hereinafter referred to generally as ABS resin. The resin matrix is intimately adhered to the reinforcing metal fibers by the use of an intermediate layer of adhesive or primer comprising a thin coating of ABS resin. The thin layer of ABS resin is applied to the ferrous metal fibers and preferably also to the zinc fibers by initially cleaning the surfaces of the fibers thoroughly, applying a phosphate coating to the surfaces of the metal fibers, then applying a thin layer of ABS resin to the surfaces of the metal fibers, preferably by applying a solution of ABS resin in an organic solvent to the fibers, drying the solution upon the fiber surfaces and then heating the fibers to fuse the ABS resin to the fiber surfaces. The resin coated metal fibers are then mixed with the desired amount of ABS or styrene resin which is to constitute the matrix of the plastic composite in any suitable manner which will provide an intimate and even distribution of the metal fibers throughout the ABS or styrene resin matrix. Preferably the ABS coated fibers are extruded with a coating or sheath of the styrene or ABS resin about the exterior of a bundle of the fibers and the bundle of fibers, together with its external sheath, is then chopped into even sized pellets which can be used as feed pellets for various subsequent plastic molding or forming operations.

It has also been discovered that if the zinc and ferrous fibers are bonded to the matrix plastic by the ABS resin bonding system of the invention that very smooth and in many cases almost mirror smooth surface finishes can be easily attained on the surface of the final products. The metal fibers are tightly bonded to the plastic so that, even while the plastic is in a moldable condition, the fibers rather than tending to be pulled from or to the surface of the plastic part during molding are instead held tightly within the matrix plastic as it is being molded. A thin layer of plastic invariably is spread or wiped over the exterior of the fibers and the ends of the fibers during molding as a result of this bonding so that a smooth mirror-like surface of plastic is attained over the entire molded plastic composite with no fibers protruding through the surface. Smooth mirror surface plastic composites can, of course, also be formed from ferrous fiber reinforced plastic with the bonding system of the present invention without the use of included sacrificial metal fibers if corrosion at cut or abraded surfaces is not a problem in a particular application.

DESCRIPTION OF THE PREFERRED EMBODIMENTS

Figure 1:
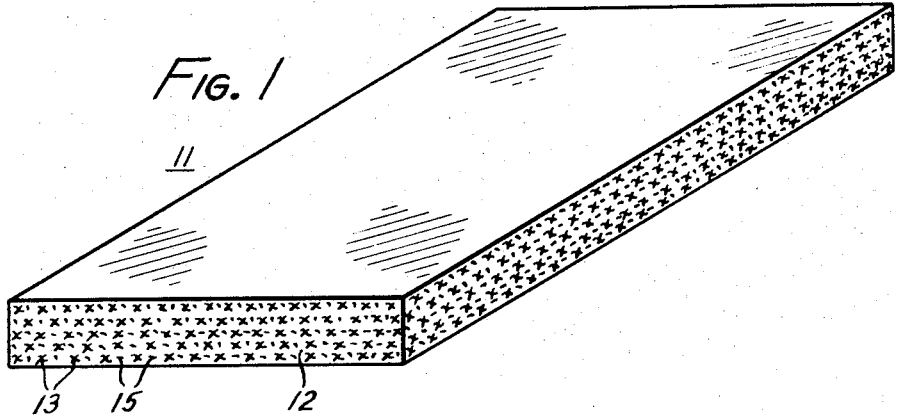
FIG. 1 is an isometric view of a corrosion resistant plastic sheet fabricated according to the present invention.

In FIG. 1 there is seen a thermoplastic composite sheet 11 molded from ABS or styrene resin 12 with ferrous fibers 13 disposed evenly throughout in the form of steel wool fibers interspersed with fibers of zinc wool 15. The relative percentages, distribution and compaction of the ferrous fibers 13 and zinc fibers 15 are such that no ferrous fiber 13 is spaced significantly more than one-eighth an inch from the nearest adjoining zinc fiber 15 and the ferrous fibers are in at least occasional effective electrical contact with the zinc fibers throughout the composite. The steel wool and zinc wool may be applied in separate but closely adjacent layers but are preferably mixed together prior to placing in the plastic matrix of the composite. Desirably, the steel wool and zinc wool may be manufactured together in a suitable ratio to provide a single bundle of ferrous and zinc fibers ready for use. The mixture of ferrous and zinc fibers can be either in the form of a loose mat or dry blend of short chopped ferrous and zinc fibers.

The ferrous fibers 13 and preferably also the zinc fibers 15 are intimately and adherently bonded to the matrix resin 12 by the interposition between the matrix and the fibers of a fused coating of ABS resin which is adherent to both the surface of the fibers—which preferably also have a phosphate coating upon their surfaces—and the resin of the matrix. This intimate bonding between the plastic matrix and the metal fiber prevents the migration of moisture and other corrosion inducing agents from a cut or abraded surface of the plastic composite where the metal fibers are exposed along the surface the fiber into the interior of the plastic composite where it could seriously weaken as well as discolor the plastic composite.

The bonding of the plastic matrix to the reinforcing fibers attained by the use of the ABS bonding system of the present invention, in addition to providing internal corrosion protection, also enables plastic articles to be molded or otherwise hot shaped from the plastic composite material with smooth defect free and often mirror-like surfaces. The bonding of the plastic matrix to the metal reinforcing fibers is so secure even at molding temperatures that the fibers are prevented from being drawn from the surface of the hot molded part by contact with the molding surfaces even while the resin material is in a plastic state during molding and it will be found that there is invariably a thin surface wash or film of plastic deposited over the surface or ends of any metal fibers near the surface of the molded part, which thin layer or film, after the plastic resin matrix has hardened or set, confers a mirror-like finish to the surface of the part (assuming of course that the mold surface is perfectly smooth). No metal fibers will be found protruding from the surface of the resulting plastic molded part.

It is not as important for the zinc or other sacrificial metal fibers to be intimately adhered to the plastic of the matrix of the plastic composite since the zinc fibers are not as corrodible as the ferrous fibers. However, it is much preferable for the zinc fibers to also be bonded to the matrix plastic by an interposed layer of fused ABS resin as this eliminates such internal corrosion as may occur on the zinc and also increases the overall strength and mechanical properties of the plastic composite to a significant degree by increasing the reinforcing effect of the zinc fibers upon the plastic composite as a whole. If a smooth mirror-like surface is desired upon the final molded plastic composite part the zinc fibers must also be bonded according to the present invention else they will tend to protrude slightly from the surface of the final molded part destroying the smoothness of the surface and often leaving defects upon the surface.

Figure 2:
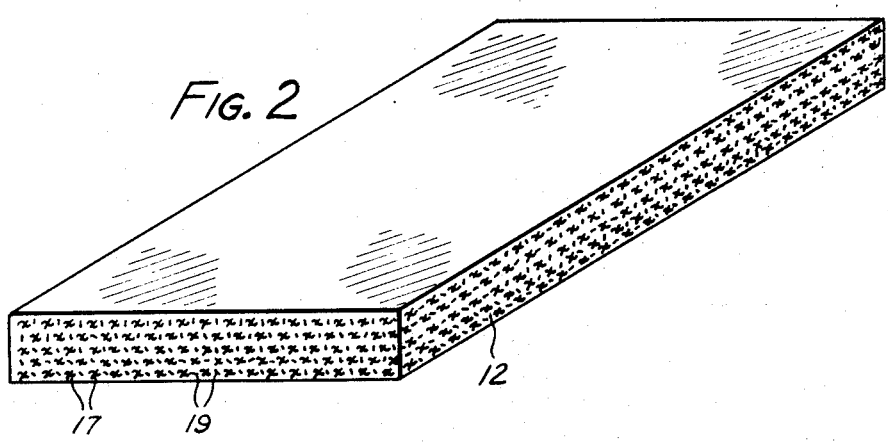
FIG. 2 is an isometric view of a second embodiment of the plastic composite of the present invention.

In an alternative embodiment shown in FIG. 2, coated ferrous fibers 17 in wool form and zinc fibers 19 in wool form are interspersed in a plastic matrix. The coating on ferrous fibers 17 is a non-ferrous sacrificial or non-sacrificial metal. The article composition is similar to FIG. 1, in which 12 is a thermoplastic styrene ABS resin and in which the fibers are dispersed in a manner similar to that previously described for FIG. 1 and are adhered to the plastic matrix by an interposed thin layer of ABS resin.

Figure 3:
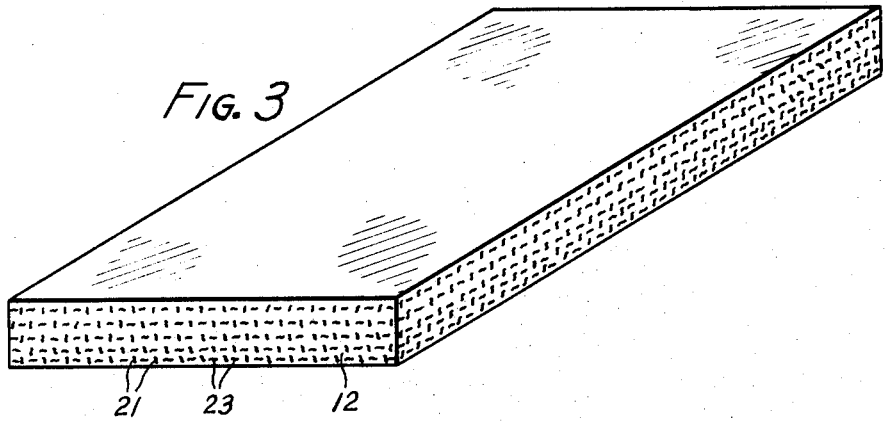
FIG. 3 is an isometric view of a still further embodiment of this invention.

In the alternate embodiment shown in FIG. 3, ferrous fibers 21 and also ferrous fibers 23 which are coated with a sacrificial metal, e.g. zinc, are interspersed in a plastic matrix. The article composition is similar to FIG. 2 in which 12 is a thermoplastic resin such as styrene or ABS and in which the fibers are dispersed and adhered to in a manner similar to that previously described for FIG. 2.

Figure 4:
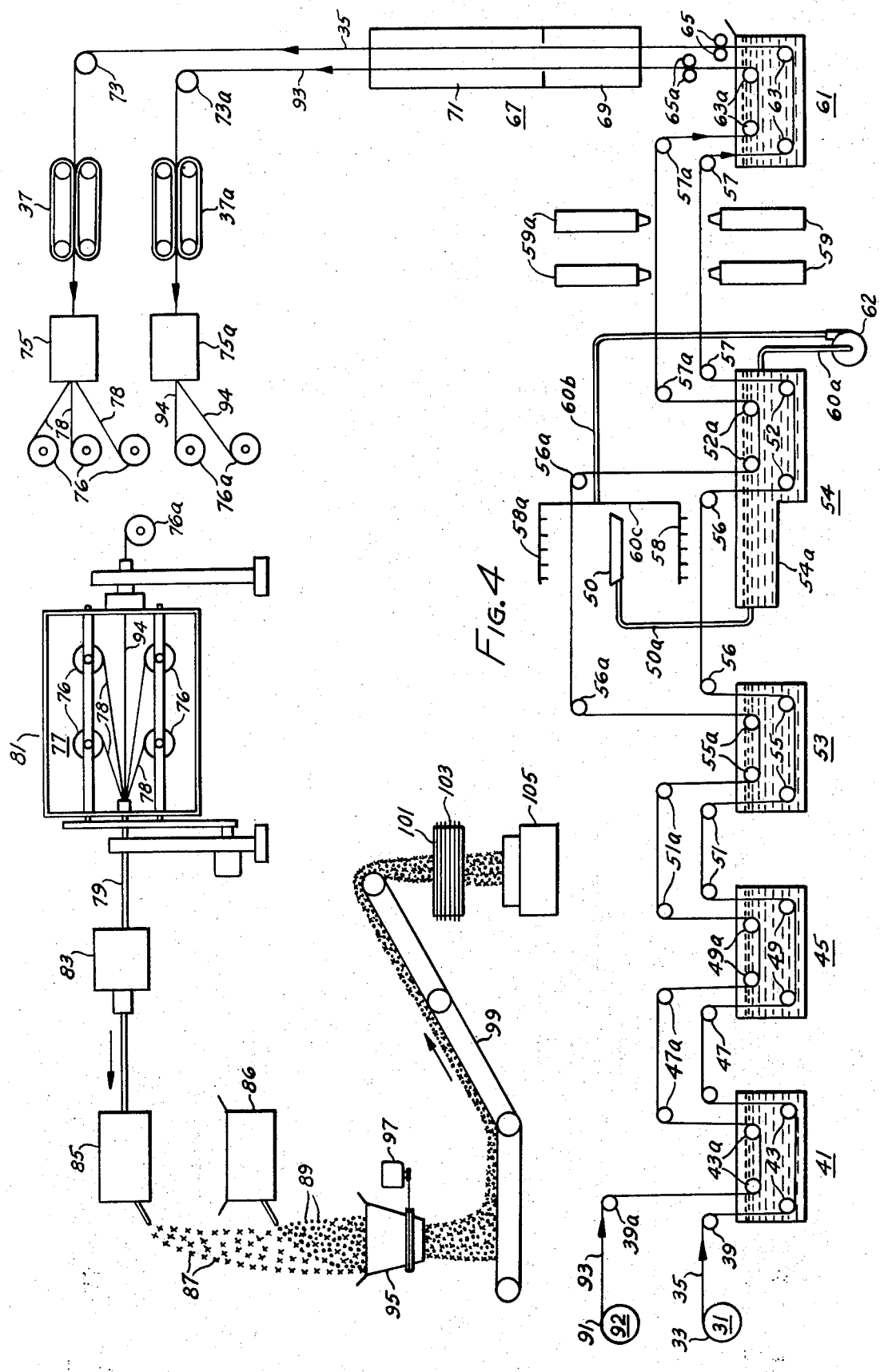
FIG. 4 is a diagrammatic view of a plastic fabrication line suitable for making plastic composites according to the present invention.

In FIG. 4 there is schematically depicted a production line suitable for making the plastic composite of the present invention. In FIG. 4 a reel 31 has a coil 33 of steel wool fibers or steel wool matting 35 coiled upon it. The steel wool fiber or matting 35 is pulled through apparatus succeeding the reel 31 by a Cat-A-Puller type capstan 37 near the end of the line. The steel wool fibers 35 pass from the reel 31 over a guide roller 39 and down into a cleaning tank 41 where the steel wool passes about a pair of sinker rolls 43 and up out of the tank 41 to a rinse tank 45. Any suitable type of alkali cleaner is contained in the cleaning tank 41 which will thoroughly clean all grease and dirt from the surface of the ferrous metal fibers comprising the steel wool matting. A pair of guide rollers 47 serve to guide the steel wool fibers 35 from the cleaning tank 41 to the rinse tank 45 and down under sinker rolls 49 in the rinse tank 45. Rinse tank 45 has an aqueous rinse solution therein such as, for example, water to rinse the cleaning solution from the metal fibers of the steel wool. From the rinse tank 45 the steel wool passes to and over guide rollers 51 to a phosphating tank 53 where a commercial phosphate solution contacts the metal fibers and deposits a coating of phosphate upon the metal fibers as they pass about sinker rolls 55. From the phosphating tank 53 the steel wool fibers pass about guide rolls 56 to a second rinse tank 54 where the steel wool matting or fibers 35 pass down around sinker rolls 52 before passing up and over guide rolls 57 between which the rinsed phosphated metal fibers are subjected to hot air blasts from hot air nozzles 59 which direct a blast of hot air at and past the metal fibers to thoroughly dry the phosphate solution upon the fibers. As the steel wool fibers 35 pass over guide rollers 56 they are subjected to rinse sprays from headers 58 which are supplied with rinse solution from the rinse tank 54 through feed lines 60a, 60b and 60c and pump 62. The solution from headers 58 drains into a shallow end 54a of the rinse tank 54.

After passing by hot air nozzles 59 the metal fibers 35 pass down into an ABS application tank 61 where the fibers are contacted by a solution of ABS resin. The resin solution may be made by dissolving reactor flake grade ABS resin in three parts of diacetone alcohol and 1 part xylene. The resin will preferably represent at least about 10% by weight of the solution. The steel fibers 35 pass about sinker rolls 63 in the ABS application tank 61 and then out of the tank through squeegee metering rollers 65, which press excess ABS plastic solution from the metallic fibers, to a heating furnace 67. Heating furnace 67 is comprised of two sections 69 and 71. Section 69 is a drying or solvent flashing section where solvent remaining from tank 61 is flash evaporated from the metallic fibers. Section 71 of furnace 67 is a fusing section where the ABS resin deposited from the solution in tank 61 is fused upon the surface of the metal fibers over the top of the prior applied phosphate coating.

After the metal fibers of the steel wool exit from fusing section 71 of heating furnace 67 the metal fibers pass over guide roll 73 and then through Cat-A-Puller 37 which directs the matting of steel wool fibers into a commercial type slitter 75 which slits the matting into two or three parallel sections or strips 78 which are then reeled upon reels 76 in preparation for twisting in twisting apparatus 77 which twists the flat strips 78 of steel wool matting which have been slit from the single mat 35 into a twisted strand 79 of steel wool having all the individual fibers coated with a thin layer of fused ABS resin. The reels 76 are transferred into the flyer 81 of the twister 77 as needed. The steel wool strips from reels 76 are combined in the twisting apparatus 77 with at least one zinc wool strip 94 coiled upon the reels 76a. As will be explained below the zinc wool fibers 93 are preferably first passed through the same coating apparatus as the steel to obtain a fused ABS resin film on the zinc fibers. The strand 79 of steel wool matting and zinc matting is then passed through an extruder 83 where a coating of ABS resin or styrene resin is placed over the surface of the twisted strand of steel wool and zinc fibers. The coated twisted strand 79 of steel wool and zinc fibers is then passed to a commercial type chopping apparatus 85 which chops or severs the coated strand into short lengths or pellets 87 of ABS coated fibers having an external jacket of styrene or ABS resin thereover. The amount of resin in the extruded jacket is preferably calculated to be exactly sufficient to form a plastic matrix with the included metal fibers when the pellets are heated.

The pellets 87 may be dropped directly from chopper 85 to a rotating mixing hopper or blender 95 where they are blended, if necessary, with pellets 89 of ABS or polystyrene resin from hopper and measuring apparatus 86 to increase the percentage of matrix plastic in the final molded product. If no additional plastic is needed no pellets of pure plastic resin will be supplied by the hopper and measuring apparatus 86.

The zinc or other sacrificial metal fibers 93 which are blended in the form of strips 94 with the ferrous fibers in the form of strips 78 in the twisting apparatus 77 are derived in basically the same manner as described above with respect to the ferrous fibers from a coil of zinc wool matting 91 on reel 92. Zinc wool fibers or matting 93 then pass through the same coating tanks 41, 45, 53, 54 and 61 and over guide and sinker rolls all appropriately numbered with the same numerical designations as the guide and sinker rolls over which the steel wool passes but, in each case, with the letter designation "a" appended thereto, and then through the same heating furnace 67 and identical slitting apparatus 75a after which the strips 94 of zinc wool matting are reeled upon reels 76a. A drain pan 50 and drain 50a are located above the rinse tank 54 to catch the drainage from rinse headers 58a.

Blender 95 is rotated by motor 97. From the blender 95 the mixed pellets may be deposited upon metering belt or web 99 which drops the pellets at a controlled rate into an induction furnace 101 having induction coils 103 thereabout. The induction furnace 101 heats the pellets 87 and 89 by induction heating of the ferrous fibers in the pellets 87 which in turn heat the surrounding plastic and the adjacent zinc fibers without detrimental degradation of the plastic material. After a batch of pellets are heated to the correct temperature in the induction furnace 101 the heated plastic may be transferred in any suitable manner to a press apparatus 105 where the sheets shown in FIG. 1 may be formed. In FIG. 4 the heated pellets are shown being discharged from the bottom of the induction coil 101 directly into the press 105. Such discharge would, of course, be periodic. It will readily be understood that the press apparatus 105 can be replaced by an extrusion apparatus, a die stamping apparatus, injection molding apparatus or any other plastic forming apparatus.

It will be understood that other methods of blending the ferrous fibers and the zinc fibers can be adapted. It is, of course, very advantageous to use a metal wool having both zinc and steel fibers initially woven into a single mat or collection of fibers. In this case only one metal wool matting need be passed through the various coating apparatus and chopped into pellets near the end of the line. In a like manner all of the ferrous fibers could initially be coated with a sacrificial metal such as zinc so that only one matting need be treated and coated. If surface corrosion of the plastic composite, furthermore, is not a serious drawback in the particular application for which the plastic composite is to be used the entire operation of preparing sacrificial metal pellets may be eliminated and the ferrous fibers merely treated with the ABS resin coating in order to attain the desired intimate bond with the plastic of the matrix. In this case all the molded or hot formed surfaces of the final plastic composite will be smooth and mirror-like due to the absence of metallic reinforcing fibers protruding from or lying at the molded surface of the composite, assuming, of course, that the plastic contacting surfaces of the hot molding apparatus have a smooth mirror-like surface finish.

It will also be understood that various changes in the sequence of some of the coating and other operations may be had. Thus in many cases it may be highly desirable to slit the steel wool and/or zinc wool initially and twist it into strands of metal fibers prior to coating the metal fibers with the phosphate and ABS coatings. Various other changes in the sequence of operations can also be made particularly with regard to the time and location of blending the sacrificial metal fibers or metal fibers coated with sacrificial metals with the ferrous fibers.

Separate coated pellets of ferrous fibers and zinc fibers may also be produced by chopping separate twisted strands of both types after extrusion coating with ABS or styrene plastic and the separate pellets blended together in blender 95 which may have special blending blades or the like therein. It is, of course, rather difficult to obtain a uniform blend in this manner.

It may also often be advantageous to phosphate treat the metal fibers in a hydrocarbon solvent rather than an aqueous solvent to eliminate rusting. For example, the so-called "Triclene" phosphatizing procedure produced by E. I. du Pont de Nemours & Co., Inc. may be used with advantage. In this system the metal fibers are both cleaned and phosphated in a trichloroethylene solvent. It has been found that any steel fiber used to reinforce the plastic composite should preferably have a maximum diameter of about 0.002 to 0.003 inches.

In one particular example of the method of preparing plastic and fiber feed pellets for forming plastic composites the ferrous metal reinforcing fibers were treated as follows. The zinc fibers would be, of course, also treated in substantially the same manner and may in some cases be preferably treated simultaneously as an integral part of the steel fiber matting where it is convenient and economical to preblend long fibers of ferrous metal and zinc together in a single matting. This can be done economically at present only where a rather large tonnage of the fibers are to be prepared and used.

The starting material used was 4 inch wide steel wool ribbon, so called Brillo "O" grade received in five pound coiled rolls. The ribbon weighed approximately 9.75 grams per square foot or 2.14 pounds per 100 feet. The steel wool fibers were approximately .0025 inches in diameter.

The ferrous wool fiber ribbon was first alkaline cleaned in so-called "Ridoline 53" produced by American Chemical Products, Incorporated with 1250 to 1500 grams of Ridoline in 100 liters of water at 180° F. The metal fibers were contacted with the alkaline cleaner solution for 1 to 3 minutes. The steel wool ribbon was then rinsed with a cold water spray as well as by immersion in cold water.

The metal wool was then phosphate coated in a solution of so-called "Granodine 1101A" produced by American Chemical Products Incorporated. 18.25 liters of the phosphate crystals per 100 liters of water and 66.6 grams of sodium hydroxide per 100 liters of water were used at a bath temperature of 160 to 180 degrees Fahrenheit. Immersion time was 30 to 45 seconds followed by a phosphate solution rinse (secured by siphoning off clear phosphate solution near the top of the tank and spraying it upon the emerging steel wool to wash off any large pieces of precipitated phosphate). The approximate coating weight of the resulting phosphate coating was 60 to 80 milligrams per square foot.

The phosphate coating was next subjected to a cold water spray rinsing and then to a compressed air drying followed by forced hot air drying.

The phosphate coated steel wool was then dip coated into a solution containing 100 grams per liter of Marbon ABS 23614 flake ABS resin #23614 produced by the Marbon Chemical Division of Borg-Warner Inc., in a 1 to 3 mixture of xylene and diacetone alcohol. Immersion time was 30 to 60 seconds.

The steel wool was then subjected to a two stage heating in a radiantly heated oven. The first stage was a solvent evaporation and removal stage at an oven air temperature of 165° F. for approximately 2.5 minutes with the vapors directed through a fan blower.

The second stage was a plastic fusion bonding stage at an oven air temperature of 435 to 450 degrees Fahrenheit for 3.5 minutes. It has been found that the product must be maintained at 400 degrees Fahrenheit or higher for a minimum of two minutes. The fused ABS coated ferrous metal fibers were then sheared into desired lengths or slit into strands which were later twisted into strands. These strands were then extrusion coated with a high impact extrusion grade of ABS resin using enough resin to provide the desired percentage of resin to metal fibers of about 15% to 40% metal fibers per weight of plastic. About 20 to 30% metal to plastic is preferred. The finished coated strand was then chopped into pellets of the desired size which could be used as the feed for any suitable type of plastics forming apparatus such as an extruder, molding press or the like.

In one example of an alternative procedure the fused ABS coated fibers were chopped into short lengths and then added to a suficient quantity of plastic ABS pellets or styrene pellets in a so-called "Mixtruder" made by the J. H. Day Company having 180 degrees spiral agitator blades, a 15 horse power agitator drive and a 10 HP. extrusion screw drive with proper jacketing for heating to 500 degrees Fahrenheit. The plastic ABS resin or styrene resin pellets were added, preheated to 400° F. m the Mixtruder and when fully plasticized the fused ABS coated fibers were added to the Mixtruder in proper proportions and mixed for 12 to 15 minutes at the end of which extrusion was started through the heated die of the Mixtruder. The extrusion die orifice could be set to provide an extrudate, for example a 2 inch rod or a 1 inch bar which could then be cut into any desired lengths for further processing.

Uniform mixes can also be easily prepared by mixing the proper proportions of chopped fused ABS coated metallic wool fibers, or ribbons together with dry granules of the desired resin in a high speed blender of any suitable type, such as a blender having a propeller type mixing element, and then pouring the uniform dry blend into suitable molds which are subsequently heated to fuse the plastic into a matrix for the metallic fibers. The molds may be subjected to compression during or subsequent to heating to improve the density of the composite.

Alternatively, blending of the fibers and/or the fibers and the plastic may be separate or combined with molding of the composite in, for example, injection molding, extrusion forming or other plastic composite forming processes well known in the art.

As used herein, a sacrificial metal and sacrificial metal coating means a metal or a metal coating having a greater electro negativity than iron. A non-sacrificial metal and a non-sacrificial metal coating would be a metal or metal coating having an electro negativity equal to or less than that of iron. In addition, the term ferrous fibers is meant to include a ferrous alloy fiber wherein iron is the predominant element.

While zinc is the preferable galvanic metal, the broad invention is not limited to the use of zinc, but encompasses the use of other sacrificial metals and alloys, and sacrificial metal composites having at least one metal constituent with a greater electro negativity than iron. Zinc and zinc alloys are, however, the preeminent materials for this purpose.

It has been found that the ABS resin adhesive, fused to the metal substrate, meets the requirements of a practical adhesive primer for the lamination of metal fibers with an ABS or styrene resin outer layer, whereas other resins, including other styrene types, will not. The ABS adhesive, besides being a low cost material, is applied readily to the metal substrate. In the fused condition, it will not wipe off during application of the ABS resin outer layer, either during a molding or an extrusion step. The non-wiping feature is of utmost importance in producing a laminate by extrusion. Additionally, the complete compatibility of ABS resin adhesive with the ABS resin or styrene resin matrix aids in a proper bonding of the two layers, even though the moldable or extrudable outer layer of resin contains the typical metallic soap type lubricant, added to aid in release from the metal mold.

In applying the adhesive primer to the substrate in the form of a solution, flake grade ABS resin is preferred, merely because of ease of handling and availability. However, any grade of ABS resin may be used, provided that it is virgin material and is relatively free from deleterious additions.

While numerous organic solvents are available for the formation of the adhesive solution of ABS resin such as esters and chlorinated hydrocarbons, ketones are found to be most satisfactory. A compound such as xylene may be added to the ketone in a quantity sufficient to prevent too rapid drying. Too rapid evaporation of the solvent could result in uneven distribution of the resin on the substrate.

The concentration of the primer solution is not critical except that it must contain sufficient resin to produce a dry film thickness which will adhere to the steel. There is no upper limit for concentration as long as the solution is sufficiently fluid to be applied to the steel surface uniformly. With a 10% by weight solution of resin, the dry film thickness on the steel sheet produced by a single pass through the coating apparatus is about 0.0002 inch. The primer solution may be applied to the metal fiber by either roller coating or immersion, or by spraying.

In fusing the ABS resin primer to the metal fiber substrate, the required temperature will generally be between about 230° and 400° F., the higher temperature being preferred because of the more rapid processing resulting therefrom. A time of from 1 to 3 minutes is usually preferred.

The temperature required for the laminating of the resin to the adhesive primed metal surface will also range, preferably, between 300 and 400° F. Sufficient heat must be applied to raise the temperature of the metal fiber substrate to the fusion temperature of the resin and to effect fusion of both the primer and the matrix resin surface in contact with the primer. Temperatures much above 400° F. are undesirable, since the resin may be thermally degraded and/or the phosphate coating decomposed. Induction heating is considered the most suitable for the fusing and molding operations, but other methods, such as hot air heating have been used.

ABS resins as commonly known can include terpolymers, graft polymers, block polymers or mixtures, singly or together and concentrations of each component may vary rather widely as long as all three components, i.e. acrylonitrile, butadiene and styrene, are present. All resins meeting the art recognized definition of an ABS resin, that is an acrylonitrile-butadiene-styrene system whose physical properties include rigidity, will work. This definition, however, excludes elastomers such as nitrile rubbers, even though the latter may contain some of the same elements as an ABS resin. Likewise the designation of a styrene base or type polymer is intended to refer to any type of styrene polymer where styrene is a major portion of the polymer.

I claim:

1. A corrosion resistant plastic composite comprising:
    (a) a matrix comprised of a styrene base plastic resin,
    (b) ferrous metal fibers disposed throughout at least a portion of said matrix,
    (c) fibers having a sacrificial metal surface having a greater electronegativity than iron disposed uniformly throughout said matrix,
    (d) said matrix plastic being securely bonded to the ferrous metal reinforcing fibers through an adhesive intermediate fused film of acrylonitrile-butadiene-styrene resin covering the surface of the ferrous fibers,
    (e) said ferrous fibers being uniformly distributed in said plastic matrix in an amount equal to about 15 to 40 weight percent of the plastic matrix and said sacrificial metal surfaced fibers being distributed uniformly throughout said matrix within a distance of said ferrous fibers effective to form a galvanic corrosion couple at a cut surface and in effective electrical contact with said ferrous fibers at least at isolated points within said plastic composite.

2. A corrosion resistant plastic composite according to claim 1 wherein the matrix plastic is comprised of acrylonitrile-butadiene-styrene resin.

3. A corrosion resistant plastic composite according to claim 1 wherein the matrix plastic is comprised principally of polystyrene.

4. A corrosion resistant plastic composite according to claim 2 wherein there is a phosphate coating under the fused film of acrylonitrile-butadiene-styrene upon the ferrous fibers.

5. A corrosion resistant plastic composite according to claim 1 additionally comprising:
    (e) a fused film of acrylonitrile-butadiene-styrene resin coating covering the surfaces of the sacrificial metal and adherent to the plastic matrix.

6. A corrosion resistant plastic composite according to claim 5 wherein the matrix plastic is comprised principally of polystyrene.

7. A corrosion resistant plastic composite according to claim 5 wherein the matrix plastic is comprised principally of acrylonitrile - butadiene - styrene adherently bonded to the adhesive film of acrylonitrile-butadiene-styrene.

8. A plastic composite having a smooth defect free surface finish formed in a hot preforming operation comprising:
    (a) a matrix comprised of a styrene base plastic resin,
    (b) ferrous metal reinforcing fibers disposed throughout said matrix in an amount equal to about 15 to 40 weight percent of the plastic matrix,
    (c) said matrix plastic resin being securely bonded to the ferrous fibers through an adhesive intermediate fused film of acrylonitrile-butadiene styrene resin covering the surface of the ferrous fibers, the bond between the ferrous fibers and the matrix plastic being sufficient to prevent the ferrous fibers from protruding from the original hot preformed surface of the plastic composite and to significantly impede the migration of corrosion inducing agents along the surfaces of the ferrous fibers from a cut surface of and into the interior of the plastic composite.

9. A plastic composite according to claim 8 additionally comprising:
    (d) a thin surface wash film of plastic extending over the top of the outer portions of all ferrous fibers adjacent to an original hot preformed surface of said composite.

10. A plastic composite according to claim 9 wherein there is a phosphate coating upon the surface of the ferrous fibers under the adhesive intermediate fused film of acrylonitrile-butadiene-styrene.

11. A plastic composite according to claim 10 wherein the matrix plastic is comprised principally of polystyrene.

12. A plastic composite according to claim 10 wherein the matrix plastic is comprised of acrylonitrile-butadiene-styrene.

13. A plastic composite according to claim 9 additionally comprising:
    (e) fibers having a sacrificial metal surface having a greater electronegativity than iron distributed throughout said plastic composite and bonded to said plastic matrix through an intermediate fused film of acrylonitrile-butadiene-styrene plastic in a manner similar to the ferrous fibers of (c).

14. A plastic composite according to claim 13 wherein the fibers having a sacrificial metal surface are composed throughout of said same sacrificial metal.

15. A plastic composite according to claim 14 wherein the sacrificial metal is zinc.

16. A plastic composite according to claim 15 wherein the matrix plastic is comprised principally of polystyrene.

17. A plastic composite according to claim 15 wherein the matrix plastic is comprised of acrylonitrile-butadiene-styrene merged with said intermediate fused film of acrylonitrile-butadiene-styrene resin covering.

18. A plastic composite according to claim 1 wherein the fibers having a sacrificial metal surface are composed throughout of the same sacrificial metal.

19. A plastic composite according to claim 18 wherein the sacrificial metal is zinc.

20. A plastic composite according to claim 19 wherein the matrix plastic is comprised principally of polystyrene.

21. A plastic composite according to claim 19 wherein the matrix plastic is comprised of acrylonitrile-butadiene-styrene resin merged with said intermediate fused film of acrylonitrile-butadiene-styrene resin covering.

References Cited

UNITED STATES PATENTS

| | | | |
|---|---|---|---|
| 3,582,456 | 6/1971 | Stolki | 161—170 X |
| 2,636,257 | 4/1953 | Ford | 29—195 P |
| 3,184,368 | 5/1965 | Juras | 161—170 X |
| 3,231,341 | 1/1966 | Sump et al. | 117—128.4 X |
| 3,455,775 | 7/1969 | Pohl et al. | 161—216 |
| 3,479,160 | 11/1969 | Klinger et al. | 29—195 P |

GEORGE F. LESMES, Primary Examiner

R. J. ROCHE, Assistant Examiner

U.S. Cl. X.R.

29—191.2, 195; 117—128.4; 161—156, 216, 217; 264—122